UNITED STATES PATENT OFFICE.

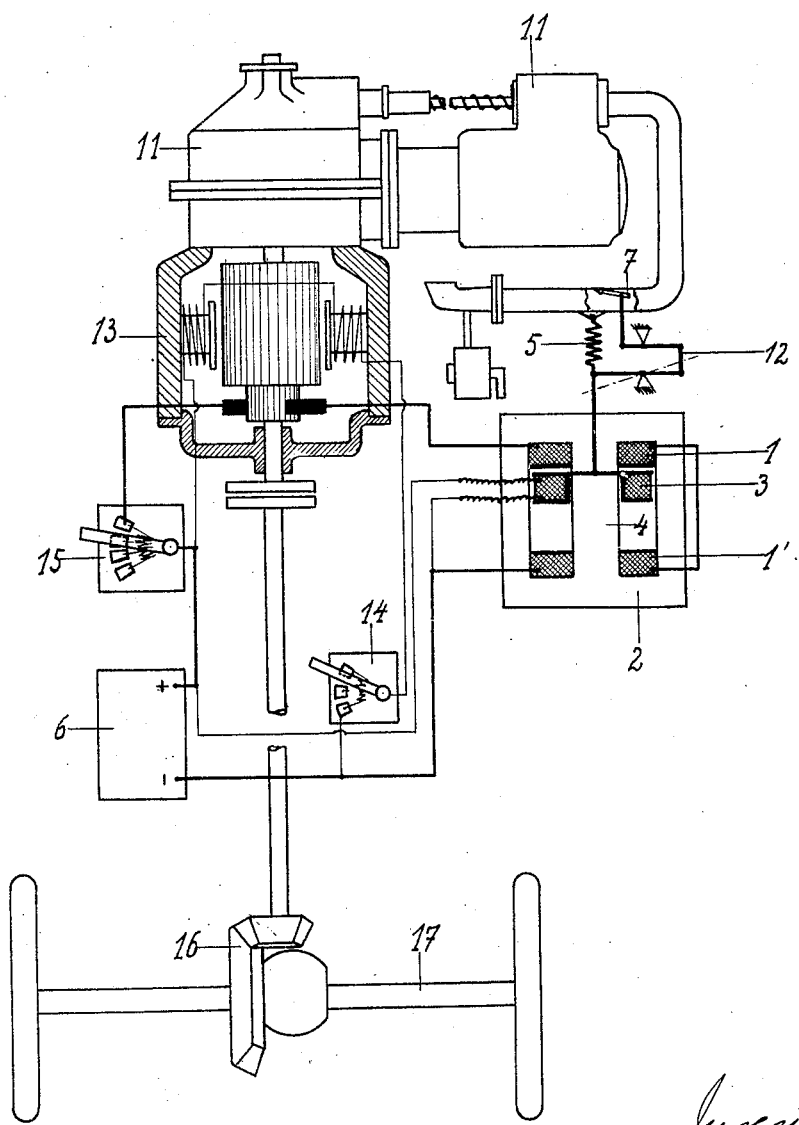

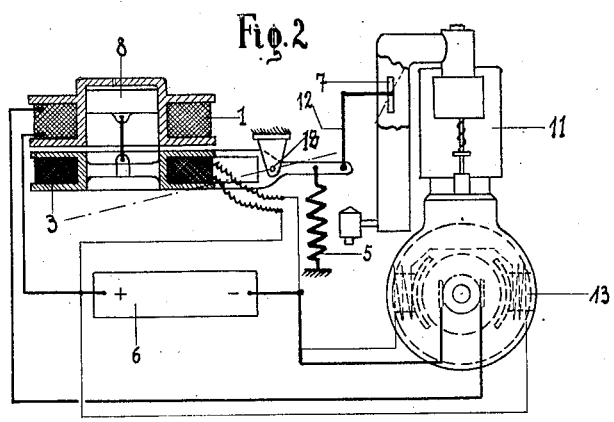
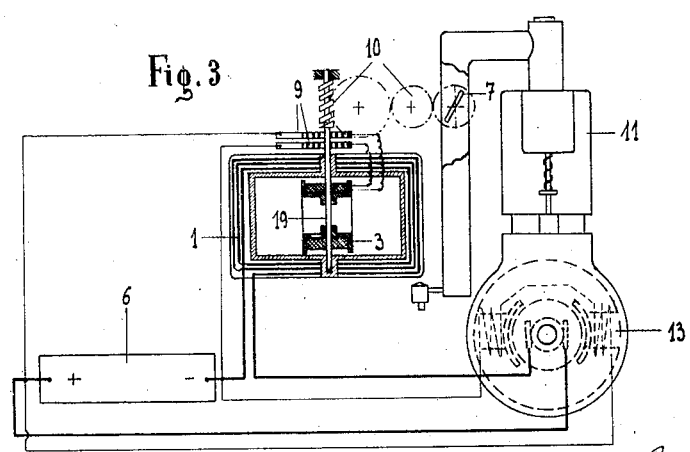

HENRI PIEPER, OF LIEGE, BELGIUM.

AUTOMATIC CONTROLLING APPARATUS FOR MIXED DRIVING SYSTEMS.

1,340,249.  Specification of Letters Patent.  Patented May 18, 1920.

Application filed November 29, 1916. Serial No. 134,139.

*To all whom it may concern:*

Be it known that I, HENRI PIEPER, manufacturer, a citizen of the Kingdom of Belgium, residing at Liege, in Belgium, have invented certain new and useful Improvements in Automatic Controlling Apparatus for Mixed Driving Systems, of which the following is a specification.

My invention relates to a device permitting to control automatically the thermic and electric power of a so-called mixed vehicle propulsion system.

As well known the mixed driving system comprises an explosion engine and a dynamo electric machine coupled together, the dynamo being enabled to work in combination with a battery either as a motor furnishing power to the wheels in addition to the thermic energy in the case of ascending hills or as a generator driven by the vehicle axis and restoring energy into the battery in the case of descending inclines or stopping.

In such a driving system the relation between the thermic power to be produced and the buffering and restoring action of the battery must be controlled in a predetermined manner. In order to charge correctly the battery the charging current must increase with the decreasing of the voltage of the battery and decrease with the augmentation of the battery charge. On the other hand the charging current must not attain an excessive value prejudicial to the battery even when completely discharged.

Consequently it is necessary to vary the thermic power according to the degree of charging between a maximum value to be obtained in the case of the battery being completely discharged and a minimum value required when the battery is completely charged. Therefore the gas admission must be reduced in accordance to the increasing of the battery voltage. But on the other hand on running on the level the thermic power must be large enough so as to propel the car and eventually to recharge the battery.

As regards the discharging there is the condition to be fulfilled that the explosion engine must be capable of furnishing its maximum output as soon as or before a discharging of the battery takes place in or to avoid an unnecessary loss of electric energy. Consequently the gas admission to the engine must be opened to the maximum extent already when the smallest discharging current occurs and must remain open to this extent for any value of discharge. Furthermore the passing over from the charging to the discharging position of the gas inlet must be operated in a rapid and sure manner even in the case of a discharging current arising suddenly.

Controlling apparatus for mixed driving systems are already known in which two stationary coils dependent the one on the current and the other on the voltage of the battery act in the case of a charging current in the same sense and in the case of a discharging current in opposite senses upon a movable iron core connected with the gas admission device of the explosion engine. This arrangement is practically satisfying only to a certain degree, because it does not work with absolute security under all circumstances and eventualities of service. There is the possibility that, in the case of an excessive discharging current suddenly arising for instance on passing over from running on the level to ascending a hill, the winding influenced by this current and brought suddenly from the minimum to the maximum excitation acts upon the iron core so as to close the gas inlet instead of to open it. A further inconvenience of such a controlling apparatus consists in that a magnetic strength of a relatively high value is to be produced and to be annihilated respectively, the opening and closing of the gas admission requiring consequently a comparatively large exciting current flowing in the one or the other direction. Also it is difficult to assure the same exactness of controlling over the whole regulating range especially when charging, because the relation existing between the exciting current and the stroke of the core varies with the degree of excitation. In order to avoid these drawbacks of the electro-magnetic controllers having a movable iron core it has been already proposed to use a small auxiliary motor for varying the thermic power, this motor receiving the charging or discharging current and opening or closing respectively the gas inlet according to the direction of rotation. But such a motor is enabled to open the gas admission only to a maximum and a minimum extent respectively without any intermediate value and determines the thermic power always in the sense of a current tending to become zero, while a correct charging of the battery supposes a regulation taking place progressively in dependence on the battery current.

The object of my invention is to realize a controlling apparatus which permits to regulate the gas admission of a mixed driving system by means of two coils dependent on the voltage and the current of the battery respectively in a sure and simple manner satisfying all the requirements of mixed driving and avoiding the inconvenience of the usual constructions. For this purpose the two coils are arranged according to my invention so that only the one coil is stationary, while the second coil is enabled to be moved against the action of an opposing force, the two coils acting the one upon the other in such a way that the movable coil is moved in the case of a charging current the stroke increasing with the augmentation of this current and provoking a corresponding decreasing of the thermic power, but occupies and maintains in the case of a discharging current a single position enabling the explosion engine to produce the maximum output.

The drawings represent in the way of example three embodiments of my invention. According to Figure 1 the two coils are arranged upon a common stationary iron core so as to act the one upon the other in the electromagnetic way, while the apparatus shown in Figs. 2 and 3 work in the manner of an electrodynamometer the moving coil being provided according to Fig. 2 beside the stationary coil and according to Fig. 3 coaxially in the interior of the stationary coil.

In the arrangement illustrated in Fig. 1 the winding traversed by the current of the battery 6 comprises two stationary coils 1 and 1' located at the opposite ends of the closed soft iron cylinder 2 and the coil 3 dependent on the voltage of the battery 6 is enabled to be moved along the soft iron core 4 coaxial to the cylinder 2 against the action of a spring 5 tending to draw the coil 3 toward the upper end of the cylinder 2. The coil 3 works also as an air damper in the closed cylinder 2 so as to control automatically the speed of its motion. The movable coil 3 acts upon the gas admission device 7 of the explosion engine 11 by means of a suitable system of levers 12 so as to open the gas inlet to the maximum extent when occupying its highest position and to close more and more the gas admission when being displaced toward the bottom of the cylinder 2 against the action of the spring 5. The explosion engine 11 is coupled directly to the dynamo electric machine 13 working in the well known manner either as a motor or as a generator in conformity with the requirements of traffic. The field winding of the dynamo 13 is connected to the battery 6 in parallel to the movable coil 3, while the armature is connected in series with the stationary coils 1 and 1' to the battery. The controllers 14 and 15 serve to regulate the current passing through the field winding and the armature respectively of the dynamo electric machine 13. The power set 11, 13 acts by means of an appropriate mechanical gearing 16 upon the axle to be driven 17, for instance, of a vehicle.

The polarity of the stationary coils 1 and 1' and of the movable coil 3 is chosen so that in the case of a discharging current passing through the stationary coils 1, 1' the movable coil 3 occupies and maintains always its highest position provoking the maximum thermic power of the mixed driving set, while in the case of a charging current the coil 3 is caused to execute against the action of the spring 5 a downstroke increasing with the augmentation of this charging current and producing a corresponding reduction of the gas admission and thereby of the thermic power. Of course, the coils 1, 1', 3 must be provided with a suitable number of turns so as to realize this working of the movable coil. Furthermore the whole apparatus must be adapted to the particularities of the gradient of the line by adjusting correspondingly the electromagnetic forces and the action of the spring. Instead of the coil dependent on the voltage of the battery also the coil traversed by the charging and discharging current can be arranged so as to be movable, the tension coil being then stationary.

By employing according to my invention the one of the two coils as moving part of the controlling apparatus there is no possibility that the gas admission device is operated in an incorrect and wrong manner by a discharging current attaining an excessively high value, which danger occurs when using the known electromagnetic controllers having a movable iron core. On the other hand the necessary progression and sensibility of regulating is obtained, which is impossible when an auxiliary motor is employed for varying the thermic power. At the same time the construction of the whole apparatus becomes simple and robust so as to be very useful especially for vehicles.

If it is desired, the controlling apparatus according to my invention may be executed without iron, whereby the drawbacks of the remaining magnetism and the necessity of reinforcing and annihilating comparatively high magnetic forces are avoided. Such embodiments of my invention are shown in Figs. 2 and 3.

According to Fig. 2 the coil 3 dependent on the voltage of the battery 6 is arranged so as to oscillate around the axis 18 under the influence of the current passing through the stationary coil 1. The oscillation of the coil 3 is damped by means of the piston 8 coupled thereto and moving in the interior of the stationary coil 1. The coil 1 is connected in series with the armature of the electric machine 13 to the battery 6. The spring 5 tends to draw the oscillating coil 3 toward the stationary coil 1 and a system of levers 12 transmits the motion of the coil 3 to the gas admission device 7 of the explosion engine 11. The two coils 1, 3 and the spring 5 work together in such a manner that in the case of a discharging current the coil 3 is attracted by the coil 1 and the spring 5 and opens the gas inlet 7 to full extent while when charging takes place the coil 3 is removed from the coil 1 against action of the spring 5 to an angle of oscillation corresponding to the degree of charging and determining the actual reduction of the thermic power.

According to Fig. 3 the two coils 1 and 3 are arranged in the manner of an electrodynamometer. The coil 3 dependent on the tension of the battery 6 is enabled to rotate by means of a spindle 19 in the interior of the coil 1 coaxial thereto, a pair of spiral springs 9 tending to draw the coil 3 into the plane of the coil 1. The spindle 19 acts upon the gas admission device 7 of the explosion engine 11 by means of a suitable gearing 10. The coil 1 and the armature of the dynamo electric machine 13 are connected in series to the battery 6. The springs 9 are connected to the poles of the battery 6 and to the ends of the coil 3. When a discharging current passes through the stationary coil 1, the rotatable coil 3 is held in the position shown in the drawing in which it opens completely the gas inlet 7, but in the case of a charging current arising it is caused to effect against the action of the spring 9 a certain rotation increasing with the value of this current so as to close more and more the gas admission of the engine.

Instead of employing the controlling apparatus according to my invention directly for acting upon the gas admission of the engine it may be used also for regulating indirectly the thermic power by operating a suitable intermediate device which on the other hand acts directly upon the gas inlet. For instance an electromagnet may be provided the field of which is varied by the moving coil of my controlling apparatus by means of a resistance being put in or out progressively by this coil, while the iron core of the electromagnet is connected with the gas admission device of the explosion engine. Furthermore it is not absolutely necessary to excite the coils by the whole battery current, because a fraction of this current may be sufficient. Finally there is the possibility to put in series with the moving and the stationary coil a variable resistance permitting to adjust the working of the coils in accordance with the gradient of the line which purpose may be realized of course also by varying correspondingly the strength of the opposing spring. Although this specification refers to a mixed driving set consisting of a dynamo and an explosive engine, it should be observed that any expanding fluid for use in engines, such as steam, may also be controlled in the manner described and that it would not be departing from the spirit of the invention to employ this device in such combination.

Having now described and ascertained the nature of my invention what I claim and desire to secure by Letters Patent is:

1. An apparatus for controlling a mixed driving set in which a load is adapted to be driven at the same time by a prime mover and by a dynamo electric machine, a storage battery being enabled to furnish current to or to be changed by said dynamo electric machine and the energy of said prime mover being controlled by two coils responsive to the current and the voltage of said battery respectively, this apparatus being characterized by the fact that the two coils are arranged so that the one coil is movable against the action of a spring while the other coil is stationary, the two coils and the spring working together in such a way that the movable coil rests in the proximity of the stationary coil in the case of discharging but is removed from this position in the case of charging to an extent augmenting with the charging current increasing so as to permit and maintain the maximum power of the prime mover when discharging and to reduce it in conformity with the charging current.

2. An apparatus for controlling the gas inlet of a so called thermo-electric driving set in which a car is adapted to be driven simultaneously by an explosion engine and by a dynamo electric machine connected to a storage battery so as to receive current from or to furnish current to said battery, the energy of said engine being controlled by two coils responsive to the current and the voltage of said battery respectively, characterized by the fact that the one of the two coils is stationary and traversed by the current of the battery, while the other coil which acts upon the gas admission device of the engine is movable against the action of a spring drawing it toward the stationary coil and carries a current dependent on the voltage of the battery, the two coils and the spring working together in such a manner that during the discharging of the battery the movable coil is attracted by the stationary coil and held permanently in the same position corresponding to the maximum thermic power while in the case of the charging of the battery it is expelled from the other coil so as to make a stroke increasing with the charging current and to reduce correspondingly the gas admission.

3. An apparatus for controlling the gas inlet of a so-called thermo-electric driving set in which a car is adapted to be driven simultaneously by an explosion engine and by a dynamo electric machine connected to a storage battery so as to receive current from or to furnish current to said battery, the energy of said engine being controlled by two coils responsive to the current and the voltage of said battery respectively, characterized by the fact that the one of the two coils is stationary and divided in two parts, a closed iron cylinder carrying at the opposite ends of its interior said coil parts, while the other coil working upon the gas inlet of said engine is slidably mounted in said closed iron core between the stationary coil parts so as to act as an air damper against the action of a spring tending to draw said slidable coil toward the one of said stationary coil parts, the coils and the spring working together so that the slidable coil is held when the battery is discharged in proximity of the one of the stationary coil parts so as to open permanently to full extent and gas admission, but is caused when the battery is charged to make a stroke increasing with the augmentation of the charging current so as to vary correspondingly the gas inlet.

In testimony whereof I affix my signature in presence of two witnesses.

HENRI PIEPER.

Witnesses:
E. M. HEFFIN,
T. COLARD.